United States Patent
Ouchi et al.

(10) Patent No.: US 9,034,518 B2
(45) Date of Patent: May 19, 2015

(54) SECONDARY BATTERY HAVING AN ELECTRODE ACTIVE MATERIAL THAT INCLUDES AN ORGANIC COMPOUND

(75) Inventors: Nao Ouchi, Nagaokakyo (JP); Masaharu Sato, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 1051 days.

(21) Appl. No.: 13/020,213

(22) Filed: Feb. 3, 2011

(65) Prior Publication Data
US 2011/0195297 A1    Aug. 11, 2011

(30) Foreign Application Priority Data
Feb. 9, 2010    (JP) .................... 2010-026372

(51) Int. Cl.
| | | |
|---|---|---|
| *H01M 4/60* | (2006.01) | |
| *H01M 4/64* | (2006.01) | |
| *H01M 4/137* | (2010.01) | |
| *H01M 10/05* | (2010.01) | |
| *H01M 4/62* | (2006.01) | |

(52) U.S. Cl.
CPC . *H01M 4/60* (2013.01); *H01M 4/62* (2013.01); *H01M 4/602* (2013.01); *H01M 4/624* (2013.01); *H01M 4/64* (2013.01); *H01M 4/137* (2013.01); *H01M 10/05* (2013.01); *Y02E 60/122* (2013.01)

(58) Field of Classification Search
CPC ....... H01M 4/137; H01M 4/60; H01M 4/602; H01M 4/62; H01M 4/624; H01M 4/64
USPC .......... 429/231.8, 213, 231.95, 314, 221, 152
See application file for complete search history.

(56) References Cited

U.S. PATENT DOCUMENTS

| | | | | |
|---|---|---|---|---|
| 5,789,107 | A * | 8/1998 | Okada et al. | 429/218.1 |
| 6,534,214 | B1 * | 3/2003 | Nishijima et al. | 429/212 |
| 7,642,011 | B2 | 1/2010 | Nakahara et al. | |
| 8,242,213 | B2 | 8/2012 | Suguro et al. | |
| 2003/0044681 | A1 * | 3/2003 | Morioka et al. | 429/213 |

(Continued)

FOREIGN PATENT DOCUMENTS

| | | | |
|---|---|---|---|
| CN | 1310485 A | 8/2001 | |
| CN | 101069307 A | 11/2007 | |
| JP | 61214372 A * | 9/1986 | H01M 10/36 |

(Continued)

OTHER PUBLICATIONS

Japanese Office Action issued for corresponding Appl No. JP 2010-026372, dated May 23, 2012 (with English translation).

*Primary Examiner* — Kenneth Douyette
(74) *Attorney, Agent, or Firm* — Arent Fox LLP (57) ABSTRACT

A secondary battery that includes a sheet-like member containing at least an electrode active material and an electrolyte; and first and second conductive layers containing at least a conductive aid and which are positioned on the opposed principal surfaces of the sheet-like member. The electrode active material contains an organic compound (for example, an organic compound having a stable radical) which participates in both oxidation and reduction reactions such that the positive electrode active material and negative electrode active material are formed from the same organic compound. In addition, the sheet-like member includes at least a polymer compound, and the organic compound contains at least one of a nitroxyl radical, a verdazyl radical, and a nitronyl nitroxyl radical.

12 Claims, 4 Drawing Sheets

(56) References Cited

U.S. PATENT DOCUMENTS

2008/0171265 A1* 7/2008 Iriyama et al. ............ 429/231.8
2008/0213669 A1   9/2008 Nakahara et al.

FOREIGN PATENT DOCUMENTS

| JP | 03034269 A | * | 2/1991 | ............ H01M 10/12 |
| JP | 07-296820 A | | 11/1995 | |
| JP | 2004-207249 A | | 7/2004 | |
| JP | 2006-173138 A | | 6/2006 | |
| JP | 2007-157496 A | | 6/2007 | |
| JP | 2008192452 A | * | 8/2008 | ............ H01M 4/60 |
| JP | 2009-217992 A | | 9/2009 | |
| JP | 2010-165491 A | | 7/2010 | |
| WO | WO-2005078831 A1 | | 8/2005 | |
| WO | WO-2008099557 A1 | | 8/2008 | |

* cited by examiner

SECONDARY BATTERY HAVING AN ELECTRODE ACTIVE MATERIAL THAT INCLUDES AN ORGANIC COMPOUND

BACKGROUND OF THE INVENTION

1. Field of the Invention

The present invention relates to a secondary battery, and more particularly, relates to a secondary battery using an organic radical compound for an electrode active material and repeating charge and discharge by making use of a battery electrode reaction of the electrode active material.

2. Description of the Related Art

With the market expansion of portable electronic devices such as cellular phones, laptop computers, and digital cameras, secondary batteries with high energy densities and long lifetimes have been demanded as codeless power sources for these electronic devices.

Then, in order to meet the demands, secondary batteries have been developed which use alkali metal ions such as lithium ions as charged carriers and make use of an electrochemical reaction involving transfer of the charges. In particular, lithium ion secondary batteries with high energy densities have been now used widely.

Among elements constituting a secondary battery, electrode active materials (a positive electrode active material and a negative electrode active material) refer to materials which contribute directly to battery electrode reactions of a charge reaction and a discharge reaction, and play a central role in the secondary battery. In addition, in a lithium ion secondary battery, a lithium-containing transition metal oxide and a carbon material are used respectively as the positive electrode active material and the negative electrode active material, and charge and discharge are carried out by making use of a reaction for intercalating lithium ions into and a reaction for deintercalating lithium ions from these electrode active materials.

However, the lithium ion secondary battery has the problem of the limited charge and discharge rate, because the lithium ion transfer at the positive electrode is a rate-limiting step. More specifically, in the lithium ion secondary battery described above, the transfer rate of the lithium ion is slow in the transition metal oxide of the positive electrode as compared with its electrolyte and negative electrode, and the rate-limiting battery reaction at the positive electrode limits the charge and discharge rate, resulting in limits to the increase in output power and to the reduction in charging time.

Therefore, in order to solve this problem, the research and development of secondary batteries using an organic radical compound as a reactant or a product of an electrode reaction have been actively carried out in recent years.

The organic radical compound includes a radical that is an unpaired electron in the outermost shell of the electron orbital. Although this radical is generally a reactive chemical species, and many of radicals will disappear after a certain period of lifetime due to the interaction with the surrounding material, the radical will be stabilized depending on the resonance effect, the steric hindrance, and the solvation state.

In addition, the radicals have a fast reaction rate, and thus allow the charging time to be completed within a short period of time by carrying out charge and discharge with the use of the redox reaction of the stable radicals. In addition, the organic radical compound has reactive unpaired electrons localized in radical atoms, and thus allows the concentration of the reaction site to be increased, thereby allowing high-capacity secondary batteries to be expected to be achieved.

Furthermore, it is believed that the organic radical compound allows an excellent secondary battery to be obtained which has a cycle characteristic independent of diffusion of the electrode active material and is thus superior in terms of stability, because only the radicals contribute to the reaction. In addition, the organic radical compound generally has, as components, elements with a small atomic weight such as carbon, hydrogen, oxygen, and nitrogen, and thus also allows a high-capacity secondary battery to be obtained while achieving reduction in the weight of the battery.

Further, for example, Patent Document 1 proposes an active material for a secondary battery, which participates in an electrode reaction of the secondary battery, and the reactant or product of the active material in the electrode reaction is a neutral radical compound.

Patent Document 1 uses, as the electrode active material, a nitroxyl radical compound, a nitroxyl nitroxide radical compound, an oxyradical compound, a nitrogen radical compound, etc., and carries out charge and discharge by making use of the redox reaction of the radicals. In addition, as described above, the radicals have a fast reaction rate, and thus lead to high outputs and also allow charging to be completed within a short period of time.

Figure 4:
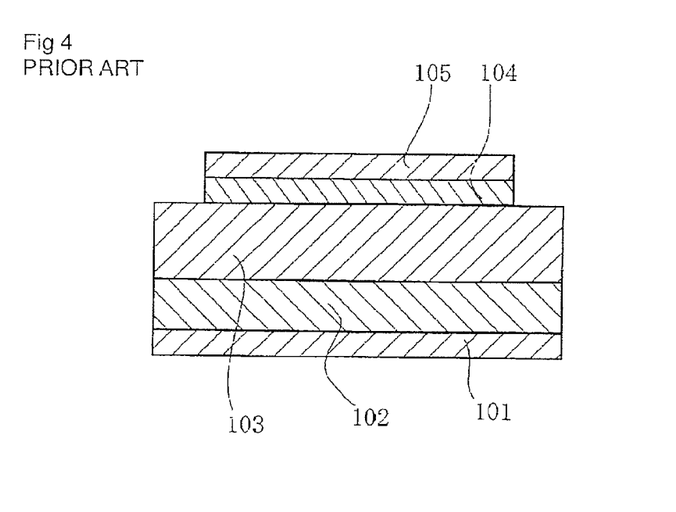
FIG. 4 is a cross-sectional view of a secondary battery described in Patent Document 1.

In addition, the secondary battery in Patent Document 1 has a stack structure with a positive electrode current collector 101, a positive electrode layer 102, a separator 103 including an electrolyte, a negative electrode layer 104, and a negative electrode current collector 105 sequentially stacked, as shown in FIG. 4, and the electrode active material of at least one of the positive electrode layer 102 and the negative electrode layer 104 contains a radical compound.

Furthermore, Patent Document 2 proposes a secondary battery using an electrode composed of a polyradical compound layer formed on an active material layer as a positive electrode and using metal lithium as a negative electrode.

In a lithium ion secondary battery, typically, in order to electrically insulate a positive electrode and a negative electrode, a gel electrolyte and a porous separator composed of polyethylene or the like are interposed between the both electrodes, as described in Patent Document 1. However, in the case of using metal lithium for the negative electrode, the thus configured battery may have, for example, dendrite (a reduction product resulting from lithium ions) at the surface of the negative electrode, caused by repeated charge and discharge, and the growth of this dendrite may lead to a breakdown of the separator, thereby causing short circuit between the positive electrode and the negative electrode.

Figure 5:
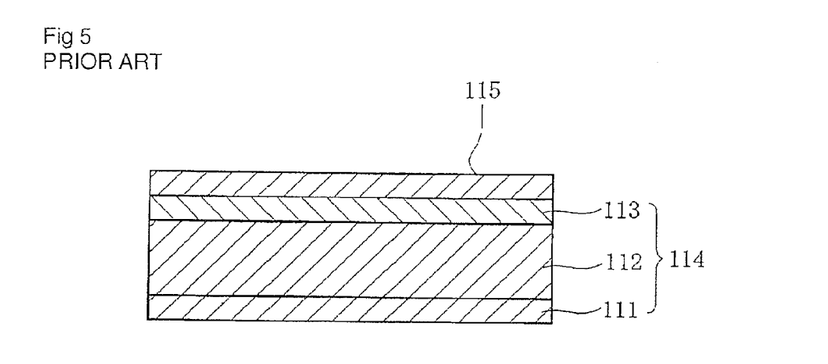
FIG. 5 is a cross-sectional view of a main section of a secondary battery described in Patent Document 2.

Therefore, in Patent Document 2, as shown in FIG. 5, the surface of an active material layer 112 formed on a current collector 111 is coated with a polyradical compound such as a nitroxyl radical compound, which serves as an insulator, in such a way that the current collector 111, the active material layer 112, and the polyradical compound layer 113 form a positive electrode 114, and metal lithium to serve as a negative electrode 115 is stacked on the positive electrode 114.

More specifically, in Patent Document 2, the polyradical compound which serves as an insulator is provided on the top layer of the positive electrode 114, and the polyradical compound layer 113 is brought into contact with the negative electrode 115 to eliminate the separator, thereby preventing any short circuit from being caused by the generation of dendrite at the negative electrode 115, even in the case of using lithium metal for the negative electrode 115.

[Patent Document 1] Japanese Unexamined Patent Application Publication No. 2004-207249 (claims 1, 3, 17, 20, and 30; and FIG. 2)

[Patent Document 2] Japanese Unexamined Patent Application Publication No. 2007-157496 (claims 1 and 2; and FIG. 1)

However, Patent Document 1 has the problem of high manufacturing cost, because the separator 103 including the electrolyte is interposed between the positive electrode layer 102 and the negative electrode layer 104 while the neutral radical compound is used for the electrode active material. In addition, while this type of secondary battery is assembled by encapsulating an electrolytic solution, the electrolytic solution is also costly, and thus leads to further soaring cost of manufacturing. Moreover, the electrolytic is flammable, and thus also problematic in terms of safety.

In addition, while the polyradical compound layer 113 constituting the positive electrode 114 is brought into contact with the negative electrode 115 to eliminate the need for the separator in Patent Document 2, an electrolytic solution has to be encapsulated for use, as in the case of Patent Document 1, thus leading to high cost, and the electrolytic solution requires careful handling, and is thus also problematic in terms of safety.

In addition, in the case of using no electrolytic solution as described in Patent Document 2, a solid electrolyte such as a polymer electrolyte is interposed between the positive electrode and the negative electrode. In this case, the contact at the interfaces between the solid electrolyte and the electrodes is critically important, thus leading to a problem with the contact at the electrode-solid electrolyte interfaces.

SUMMARY OF THE INVENTION

The present invention has been achieved in view of these circumstances, and an object of the present invention is to provide a secondary battery, which can be manufactured with safety in mind in a simple and inexpensive way without the need for any separator or an electrolytic solution.

In order to achieve the object, a secondary battery according to the present invention is a secondary battery for repeating charge and discharge by a battery electrode reaction of an electrode active material. Characteristically, the secondary battery includes a sheet-like member containing at least the electrode active material and an electrolyte, a conductive layer containing at least a conductive aid is formed on both principal surfaces of the sheet-like member, the electrode active material mainly contains an organic compound which participates in both oxidation and reduction reactions, and the sheet-like member includes at least a polymer compound.

As described above, the conductive layer is formed on the both principal surfaces of the insulating sheet-like member. Thus, the secondary battery can be configured in such a way that one of the conductive layers forms a positive electrode, whereas the other conductive layer forms an negative electrode.

In addition, the secondary battery according to the present invention is characterized in that a positive electrode active material and a negative electrode active material comprising the electrode active material are formed from the same organic compound.

The positive electrode active material and the negative electrode active material comprising the electrode active material are formed from the same organic compound, thus allowing the electrode active material to be used without distinguishing the positive electrode and the negative electrode.

In addition, the secondary battery according to the present invention is characterized in that the organic compound has a stable radical.

The organic compound has a stable radical, thus allowing the charging time to be completed within a short period of time.

In addition, the secondary battery according to the present invention is characterized in that the organic compound includes a polymer radical compound or a derivative thereof.

The organic compound includes a polymer radical compound or a derivative thereof, thus allowing a high-power secondary battery to be obtained.

In addition, the secondary battery according to the present invention is characterized in that the organic compound includes a low-molecular radical compound or a derivative thereof, and the sheet-like member contains a polyelectrolyte.

The organic compound includes a low-molecular radical compound or a derivative thereof, and the sheet-like member contains a polyelectrolyte. Thus, without the use of a polymer radical compound or a derivative thereof for the electrode active material, the use of the polyelectrolyte containing an electrolyte salt for the electrolyte allows the electrolyte to be easily formed into a sheet.

In addition, the secondary battery according to the present invention is characterized in that the organic compound contains at least one of:

a nitroxyl radical represented by the following chemical formula 4;

[Chemical Formula 4]

a verdazyl radical represented by the following chemical formula 5; and

[Chemical Formula 5]

(provided that R indicates a substituted or unsubstituted methylene group)

a nitronyl nitroxyl radical represented by the following chemical formula 6.

[Chemical Formula 6]

As described above, as the organic compound, compounds containing a nitroxyl radical, a verdazyl radical, or a nitronyl nitroxyl radical can be preferably used.

Furthermore, the secondary battery according to the present invention is characterized in that at least one of an upper layer surface and a lower layer surface of the sheet-like member contains the conductive aid.

Thus, the region of the sheet-like member excluding the upper layer surface and the lower layer surface is mainly composed of the electrode active material and the electrolyte, and even when the positive electrode active material and the negative electrode active material are formed from the same organic compound, the secondary battery can be formed without any short circuit between the positive electrode and the negative electrode.

In addition, the secondary battery according to the present invention is characterized in that the sheet-like member and the conductive layer form a battery body, and multiple battery bodies are stacked.

As described above, the multiple battery bodies stacked allow for a stack structure, and thus allow high-power and high-capacity secondary batteries to be achieved without the need for any electrolytic solution or separator.

In addition, the secondary battery according to the present invention is also preferably characterized in that the conductive layer contains the electrolyte and the electrode active material.

The above-described secondary battery includes the sheet-like member containing at least the electrode active material and the electrolyte, the conductive layer containing at least the conductive aid is formed on the both principal surfaces of the sheet-like member, the electrode active material mainly contains an organic compound which participates in both oxidation and reduction reactions, and the sheet-like member includes at least the polymer compound. Thus, the positive electrode active material and the negative electrode active material can be formed from the same organic compound. Therefore, without the need for any costly separator or electrolytic solution, the main section can be formed into a sheet of the sheet-like member, thereby allowing a desirable secondary battery to be obtained in a simple and inexpensive way. Moreover, since no flammable electrolytic solution is included, the safety and workability are also improved.

DETAILED DESCRIPTION OF THE INVENTION

Next, embodiments of the present invention will be described in detail.

Figure 1:
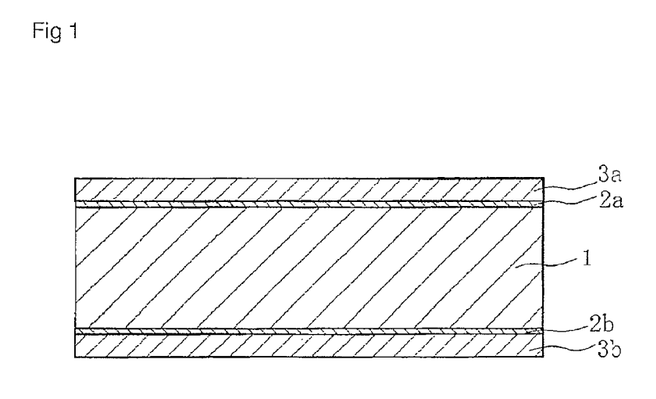
FIG. 1 is a cross-sectional view illustrating an embodiment (first embodiment) of a secondary battery according to the present invention.

FIG. 1 is a cross-sectional view illustrating an embodiment (first embodiment) of a battery body of a secondary battery according to the present invention. The secondary battery is used with the battery body, for example, contained in a coin cell with a predetermined size.

This battery body includes a sheet-like member 1, and first and second conductive layers 2a and 2b formed respectively on the both principal surfaces of the sheet-like member 1 in an integrated manner with the sheet-like member 1. Furthermore, a first current collector 3a and a second current collector 3b are respectively formed on the surfaces of the first and second conductive layers 2a and 2b.

The sheet-like member 1 includes at least an electrode active material and an electrolyte, and contains a polymer compound.

In addition, the electrode active material refers to a material which contributes directly to battery electrode reactions of a charge reaction and a discharge reaction, and in the present embodiment, the electrode active material is formed mainly from an organic compound which participates in both oxidation and reduction reactions. Thus, the positive electrode active material and negative electrode active material comprising the electrode active material can be formed from the same organic compound. Specifically, the electrode active material is formed from an organic compound containing a stable radical present stably for a long period of time (hereinafter, referred to as an "organic radical compound").

In this case, the radical concentration of the stable radical can be quantitatively assessed in terms of spin concentration. This spin concentration is defined by the number of radicals per unit, and for example, can be measured by a spectrum analysis of an electron resonance spectrum.

Then, in the present embodiment, a stable radical with its spin concentration of $10^{21}$ spins/g or more in equilibrium kept for one or more seconds is used as the stable radical present stably for a long period of time as described above.

In addition, this stable radical can include a nitroxyl radical represented by the following chemical formula (1), a verdazyl radical represented by the following chemical formula (2), and a nitronyl nitroxyl radical represented by the following chemical formula (3).

(1)

(2)

(provided that R indicates a substituted or unsubstituted methylene group)

(3)

As described above, the electrode active material mainly containing an organic radical compound which participates in both oxidation and reduction reactions allows the positive electrode active material and negative electrode active material comprising the electrode active material to be formed from the same organic compound, allows the electrode active material and the electrolyte to be formed into the shape of a sheet, and moreover, allows the electrode active material to be used without distinguishing the positive electrode and the negative electrode.

In addition, the electrolyte is intended to transport charged carriers between the positive electrode active material and the negative electrode active material, and formed in an integrated manner with the electrode active material in the sheet-like member 1 in the present embodiment.

Furthermore, at least one of the electrode active material and the electrolyte contains a polymer compound.

In the case of the electrode active material containing the polymer compound, a material is more preferably used which has a molecular weight of 100 or more from the point of view of battery characteristics and is unlikely to be dissolved in an organic solvent. The electrode active material includes the stable radical in the present invention, and the polymer compound thus includes the stable radical. Therefore, in this case, the electrode active material includes a polymer radical compound or a derivative thereof, and is allowed to contain an electrolyte salt, thereby forming the sheet-like member 1.

On the other hand, when the electrode active material is formed from a low-molecular radical compound or a derivative thereof, the electrolyte includes a polymer electrolyte containing an electrolyte salt, and the sheet-like member 1 thus contains the low-molecular radical compound or a derivative thereof and the polymer electrolyte.

The sheet-like member 1 is allowed to contain the polymer compound, because it is difficult to form a mixture of the electrode active material and the electrolyte into the shape of a sheet unless the sheet-like member 1 contains a polymer compound that is a viscoelastic body.

In addition, the first and second conductive layers 2a and 2b contain at least a conductive aid, and may contain the electrode active material and the electrolyte in some cases, depending on the material for use in the conductive aid. In addition, the sheet-like member 1 may also contain the conductive aid in addition to the electrode active material and the electrolyte in some cases, depending on the material for use in the conductive aid.

More specifically, the conductive aid is not particularly limited, and for example, carbonaceous particulate such as graphite, carbon black, and acethylene black; carbon fibers such as vapor-grown carbon fibers, carbon nanotubes, and carbon nanohorn; and conductive polymers such as polyaniline, polypyrrole, polythiophene, polyacethylene, and polyacene can be used as the conductive aids.

In addition, two or more types of conductive aids can be mixed and used.

However, when a vapor-grown carbon fiber or other carbon fiber is used as the conductive aids, the first and second conductive layers 2a and 2b contain the electrode active material and the electrolyte in addition to the conductive aids, and the upper layer surface and lower layer surface of the sheet-like member 1 in contact with the first and second conductive layers 2a and 2b contain the conductive aids. More specifically, as is clear from a manufacturing step described later, the sheet-like member 1 and the first and second conductive layers 2a and 2b are formed in an integrated manner without distinguishing therebetween. Thus, when a vapor-grown carbon fiber or other carbon fiber is used as the conductive aids, the electrode active material and electrolyte contained in the sheet-like member 1 are also mixed into the first and second conductive layers 2a and 2b, whereas the conductive aids contained in the first and second conductive layers 2a and 2b is also contained into the upper layer surface and lower layer surface of the sheet-like member 1. Therefore, in such a case, the first and second conductive layers 2a and 2b are formed from the conductive aids, the electrode active material, and the electrolyte. In addition, the sheet-like member 1 mainly contains the electrode active material and the electrolyte, and can thus ensure insulation substantially, while the upper layer surface and lower layer surface of the sheet-like member 1 may include the conductive aids.

It is to be noted that the first and second current collectors 3a and 3b are not particularly limited, as long as the current collectors are conductive materials, and for examples, metal foil and metal plates, such as Al, Cu, Ni, Au, Ag, an Al alloy, and stainless steel, mesh-like electrodes, carbon electrodes, etc. can be used as the first and second current collectors 3a and 3b.

As described above, the secondary battery according to the present embodiment includes the sheet-like member 1 containing at least the electrode active material and the electrolyte, and the first and second conductive layers 2a and 2b containing at least the conductive aid are formed respectively on the both principal surfaces of the sheet-like member 1, the electrode active material mainly contains an organic compound which participates in both oxidation and reduction reactions, and the sheet-like member 1 contains at least the polymer compound. Thus, without having any costly separator or electrolytic solution, the main section which participates in the battery electrode reactions, that is, the electrode active material and the electrolyte can be formed into a sheet of the sheet-like member 1, thereby allowing a simple and inexpensive secondary battery to be obtained without any short circuit between the first current collector 3a and the second current collector 3b. Moreover, since no flammable electrolytic solution is used, the improvement in safety and workability can be achieved.

In addition, the positive electrode active material and negative electrode active material constituting the electrode active material can be formed from the same organic radical compound, and thus used without distinguishing between the positive electrode and the negative electrode, resulting in improvement in usability.

Next, examples of a nitroxyl radical compound having the nitroxyl radical, a verdazyl radical compound having the verdazyl radical, and a nitronyl nitroxyl radical compound having the nitronyl nitroxyl radical will be specifically shown.

(Nitroxyl Radical Compound)

The nitroxyl radical compound can be represented by the following general formula (4).

In the formula, $X_1$ and $X_2$ are an alkyl group or an aryl group. However, the alkyl group may be substituted or unsubstituted, may be chained, cyclic, or branched, and may include one or more oxygen, nitrogen, sulfur, silicon, phosphorus, boron, or halogen atoms. In addition, the aryl group may be substituted or unsubstituted, and may include one or more oxygen, nitrogen, sulfur, silicon, phosphorus, boron, or halogen atoms. When $X_1$ and $X_2$ include a hydroxyl group, the hydroxyl group may form a salt together with a metal atom. When $X_1$ and $X_2$ include any of an alkoxy group, an aldehyde group, a carboxyl group, an alkoxycarbonyl group, a cyano group, an amino group, a nitro group, and a nitroso group, these substituents may be substituted or unsubstituted, and may include one or more oxygen, nitrogen, sulfur, silicon, phosphorus, boron, or halogen atoms. $X_1$ and $X_2$ may be identical or different. $X_1$ and $X_2$ may form a ring.

The following chemical reaction (5) shows an example of a charge and discharge reaction in the case of using the nitroxyl radical compound for the electrode active material, and the reaction proceeds from the formula (I) to the formula (II) during charging, whereas the reaction proceeds from the formula (II) to the formula (I) during discharging.

Furthermore, the nitroxyl radical compound can include a piperidinoxy radical compound represented by a chemical formula (4a), a proxy radical compound represented by a chemical formula (4b), a pyrrolinoxy radical compound represented by a chemical formula (4c), a di-tert-butylnitroxy radical compound represented by a chemical formula (4d), an azaadamantyl radical compound represented by a chemical formula (4e), a trimethyl di-azaadamantyl radical compound represented by a chemical formula (4f), a cross-linked alicyclic nitroxy radical compound represented by a chemical formula (4g), and aromatic nitroxy radical compounds as represented by chemical formulas (4h) to (4l).

(4a)

(4b)

(4c)

(4d)

(4e)

(4f)

(4g)

(4h)

(4i)

(4j)

(4k)

(4l)

(Verdazyl Radical Compound)

The verdazyl radical compound can be represented by the following general formula (6).

(6)

In the formula, $X_3$ to $X_5$ are an alkyl group or an aryl group. However, the alkyl group may be substituted or unsubstituted, may be chained, cyclic, or branched, and may include one or more oxygen, nitrogen, sulfur, silicon, phosphorus, boron, or halogen atoms. The aryl group may be substituted or unsubstituted, and may include one or more oxygen, nitrogen, sulfur, silicon, phosphorus, boron, or halogen atoms.

The following chemical reaction (7) shows an example of a charge and discharge reaction in the case of using the verdazyl radical compound for the electrode active material, and the reaction proceeds from the formula (I) to the formula (II) during charging, whereas the reaction proceeds from the formula (II) to the formula (I) during discharging.

(7)

Further, the verdazyl radical compound can include compounds represented by the following chemical formulas (6a) to (6e).

(6a)

(6b)

(6c)

(6d)

(6e)

(Nitronyl Nitroxyl Radical Compound)
The nitronyl nitroxyl radical compound can be represented by the following general formula (8).

(8)

In the formula, $X_6$ to $X_8$ are a substituent including at least one alkyl group, aryl group, hydroxyl group, alkoxy group, aldehyde group, carboxyl group, alkoxycarboxyl group, cyano group, amino group, nitro group, nitroso group, halogen atom, or hydrogen atom.

However, when $X_6$ to $X_8$ include an alkyl group, the alkyl group may be saturated or unsaturated, and may include one or more oxygen, nitrogen, sulfur, silicon, phosphorus, boron, or halogen atoms. When $X_6$ to $X_8$ include an aryl group, the aryl group may be substituted or unsubstituted, and may include one or more oxygen, nitrogen, sulfur, silicon, phosphorus, boron, or halogen atoms. The alkyl group may be substituted or unsubstituted, may be chained, cyclic, or branched, and may include one or more oxygen, nitrogen, sulfur, silicon, phosphorus, boron, or halogen atoms. $X_7$ and $X_8$ may be identical or different. $X_6$ and $X_7$ may form a ring.

The following chemical reaction (9) shows an example of a charge and discharge reaction in the case of using the nitronyl nitroxyl radical compound for the electrode active material, and the reaction proceeds from the formula (I) to the formula (II) during charging, whereas the reaction proceeds from the formula (II) to the formula (I) during discharging.

Further, the nitronyl nitroxyl radical compound can include compounds represented by the following chemical formulas (8a) to (8h).

(8a)

(8b)

(8c)

(8d)

(8e)

(8f)

(8g)

(8h)

Next, a method for manufacturing a secondary battery will be described with reference to FIG. 2, for the case of using a polymer radical compound for the organic radical compound.

First, a conductive aid is applied onto a second current collector 3b with an adhesive agent interposed therebetween to form a second conductive layer 2b on the second current collector 3b, as shown in FIG. 2(a).

In addition, the adhesive agent is not particularly limited, and various types of resins can be used, such as polyethylene, polyvinylidene fluoride, polyhexafluoropropylene, polytetrafluoroethylene, polyethylene oxide, and carboxymethyl cellulose.

Next, a polymer radical compound to serve as an electrode active material is dissolved in an organic solvent to produce a slurry, and an electrolyte salt is then dissolved in this slurry to produce a mixture containing the electrode active material and the electrolyte salt.

In this case, an ethylene carbonate, a propylene carbonate, a dimethyl carbonate, a diethyl carbonate, a methyl ethyl carbonate, γ-butyrolactone, tetrahydrofran, dioxolane, sulfolane, dimethylformamide, dimethylacetoamide, N-methyl-2-pyrrolidone, etc. may be used as the organic solvent.

In addition, for example, $LiPF_6$, $LiClO_4$, $LiBF_4$, $LiCF_3SO_3$, $LiN(CF_3SO_2)_2$, $LiN(C_2F_5SO_2)_2$, $Li(CF_3SO_2)_3C$, $Li(C_2F_5SO_2)_3C$, etc. can be used as the electrolyte salt.

Figure 2:
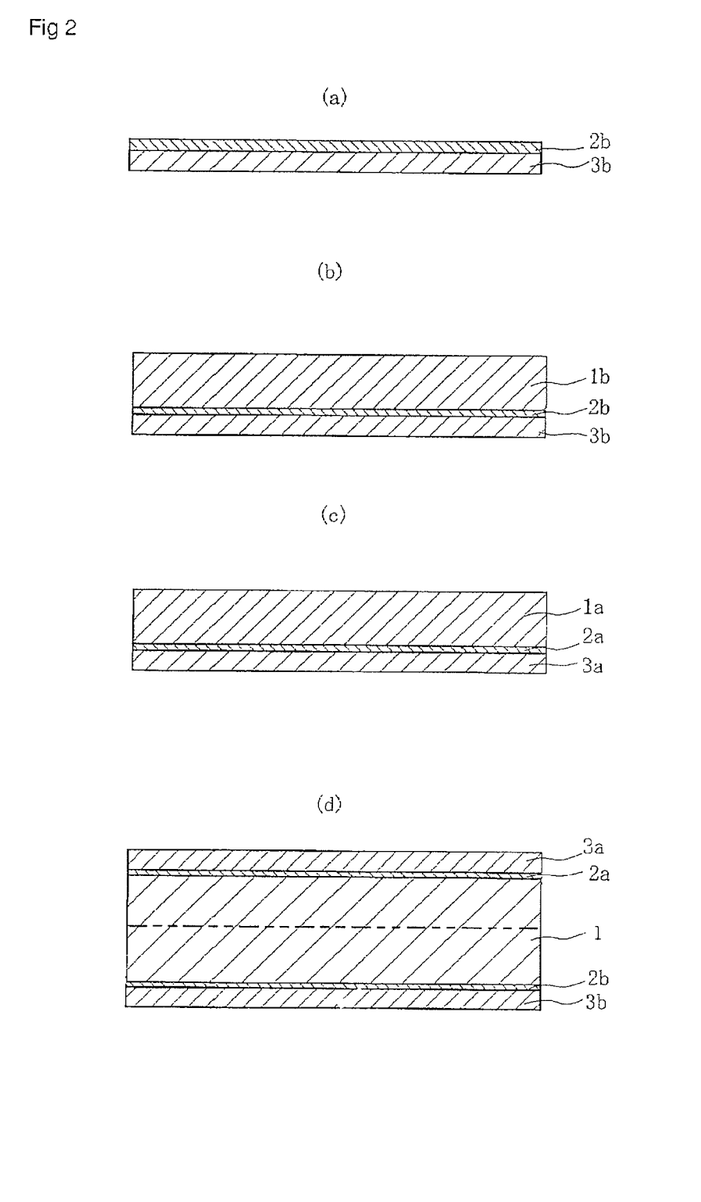
FIG. 2 is a diagram illustrating a method for manufacturing the secondary battery.

Then, the mixture obtained in this way is casted onto the second conductive layer $2b$, and the organic solvent is dried to form a first mixture layer $1b$ as shown in FIG. 2($b$). In this case, the first mixture layer $1b$ and the second conductive layer $2b$ are formed in an integrated manner. Thus, in the case of using a fibrous material such as vapor-grown carbon fibers as the conductive aid, the electrode active material and the electrolyte are mixed into the second conductive layer $2b$, and the conductive aid is mixed into the layer surface of the first mixture layer $1b$.

Likewise, as shown in FIG. 2(C), a first conductive layer $2a$ is formed on a first current collector $3a$, and a second mixture layer $1a$ is further formed on the first conductive layer $2a$. Also In this case, the second mixture layer $1a$ and the first conductive layer $2a$ are formed in an integrated manner. Thus, in the case of using a fibrous material such as vapor-grown carbon fibers as the conductive aid, the electrode active material and the electrolyte are mixed into the first conductive layer $2a$, and the conductive aid is mixed into the layer surface of the second mixture layer $1a$.

Then, as shown in FIG. 2($d$), the surface of the first mixture layer $1b$ and the surface of the second mixture layer $1a$ are joined, and subjected to thermocompression bonding to manufacture a sheet-like member 1 formed in an integrated manner with the first and second conductive layers $2a$ and $2b$, thereby providing a battery body.

Then finally, this battery body is contained in a coin cell, thereby manufacturing a secondary battery.

As described above, in the present embodiment, the secondary battery is configured without the need for any costly separator or electrolytic solution, and can be thus manufactured in an inexpensive way without the need for any cumbersome step. Moreover, since no flammable electrolytic solution is used, the secondary battery can also contribute to the improvement in safety.

Figure 3:
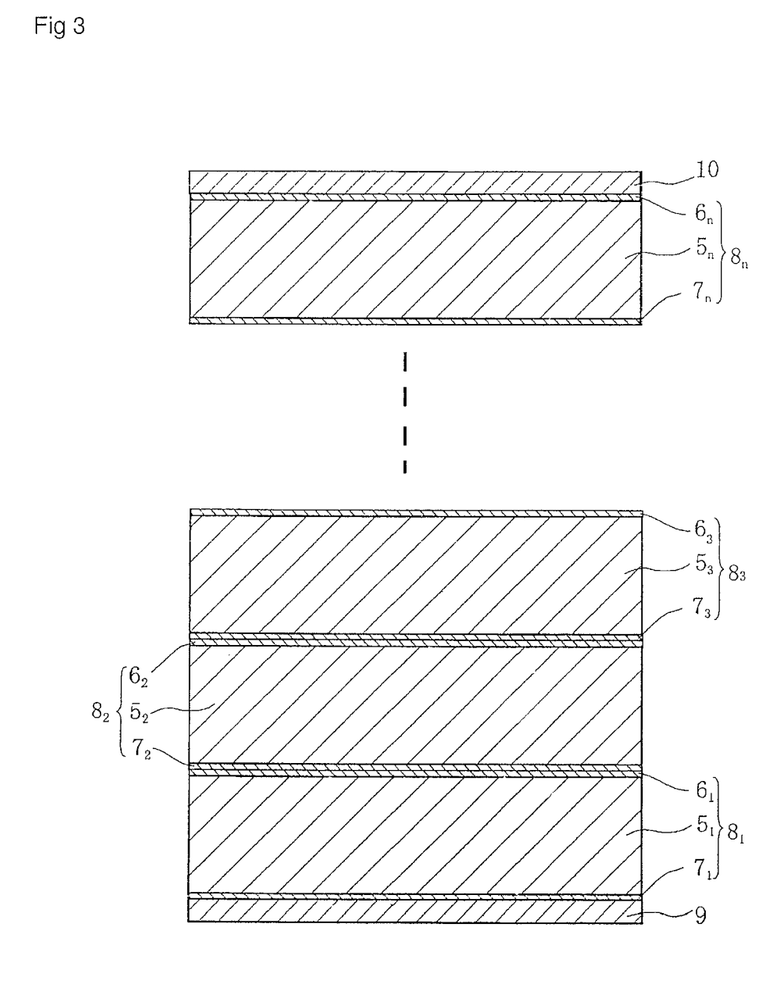
FIG. 3 is a cross-sectional view illustrating a second embodiment of a secondary battery according to the present invention.

FIG. 3 shows a secondary battery illustrating a second embodiment of the present invention, and a stack structure is adopted in the second embodiment.

More specifically, multiple battery bodies $8_n$ (n=1, 2, ... ) are stacked each including a set of a sheet-like member $5_n$ (n=1, 2, ... ) and conductive layers $6_n$ and $7_n$ (n=1, 2, ... ) formed in an integrated manner with the sheet-like member $5_n$, a second current collector 9 is formed on the lower surface of the bottom conductive layer $7_1$, and a first current collector 10 is formed on the upper surface of the top conductive layer $6_n$.

In addition, the sheet-like members $5_n$ (n=1, 2, ... ) is formed from an electrode active material, an electrolyte, and a conductive aid, and contains a polymer compound in the same way as in the first embodiment.

In addition, the conductive layers $6_n$ and $7_n$ (n=1, 2, ... ) also contain at least a conductive aid, and includes the electrode active material and the electrolyte depending on the material for use in the conductive aid, in the same way as in the first embodiment.

The present invention includes no electrolytic solution or separator, and thus, can easily provide a stack structure as in the case of the second embodiment, thereby allowing an increase in voltage and an increase in capacity to be achieved, and allowing a high-power secondary battery with a desired capacity to be obtained.

It is to be noted that the present invention is not to be considered limited to the embodiments described above. The cases of using polymer radical compounds and derivatives thereof for the electrode active material have been described as examples in the embodiments described above. On the other hand, in the cases of using low-molecular radical compounds and derivatives thereof for the electrode active material, the low-molecular radical compound or a derivative thereof may be dissolved in an organic solvent, whereas a polymer electrolyte containing an electrolyte salt may be dissolved in an organic solvent, and the both may be mixed, and then casted onto the conductive layer.

In this case, the polymer electrolyte is not to be considered particularly limited, and can include, for example, vinylidene fluoride-based copolymers such as polyvinylidene fluoride, a vinylidene fluoride-hexafluoropropylene copolymer, a vinylidene fluoride-ethylene copolymer, a vinylidene fluoride-monofluoroethylene copolymer, a vinylidene fluoride-trifluoroethylene copolymer, a vinylidene fluoride-tetrafluoroethylene copolymer, and a vinylidene fluoride-hexafluoropropylene-tetrafluoroethylene terpolymer; acrylonitrile-based copolymers such as an acrylonitrile-methyl methacrylate copolymer, an acrylonitrile-methyl acrylate copolymer, an acrylonitrile-ethyl methacrylate copolymer, an acrylonitrile-ethyl acrylate copolymer, an acrylonitrile-methacrylic acid copolymer, an acrylonitrile-acrylic acid copolymer, and an acrylonitrile-vinyl acetate copolymer; and further, polyethylene oxides, ethylene oxide-propylene oxide copolymers, and polymers of acrylates and methacrylates thereof.

In addition, while the first mixture layer $1b$ and the second mixture layer $1a$ are separately manufactured and joined to obtain the sheet-like member 1 in the embodiment described above, the sheet-like member 1 may be formed by forming a conductive layer and a mixture layer on a sheet of current collector, folding the current collector with the conductive layer and mixture layer formed thereon in two, and heating the folded current collector to attach the mixture layers to each other, and then cutting the folded section. Alternatively, a conductive layer and a sheet-like member may be manufactured on a sheet of current collector, and another conductive layer and current collector may be sequentially manufactured on the sheet-like member.

Next, examples of the present invention will be specifically described.

Example 1

Poly(2,2,6,6-tetramethyl-4-piperidinoxy methacrylate) (hereinafter, referred to as "PTMA") represented by the following chemical formula (10) was prepared, which falls into the category of the piperidinoxy radical compound (see the chemical formula (4a)).

(10)

Next, this PTMA was dissolved in N-methyl-2-pyrrolidone as an organic solvent, and lithium bis(trifluoromethanesulfonyl)imide ($LiN(SO_2CF_3)_2$; hereinafter referred to as "LiTFSI") as an electrolyte salt was dissolved in the organic solvent with the PTMA dissolved, thereby producing a slurry.

Then, a vapor-grown carbon fiber as a conductive aid was applied onto Al as current collectors, the surfaces of the vapor-grown carbon fiber were then coated with polyvinylidene fluoride as an adhesive agent, the slurry was casted thereon, the organic solvent was dried to form, on the current collectors, mixture layers each including the PTMA as an electrode active substance and the LiTFSI as an electrolyte salt.

Then, two of the mixture layers formed on the current collectors were stacked so that the surfaces of the mixture layers are joined with each other, and subjected to thermocompression bonding by pressing at a temperature of about 100° C., thereby manufacturing a battery body. Further, the thickness of this battery body was about 200 μm.

After that, this battery body was put in a 2032-type coin cell to provide a secondary battery.

As a result of charging and discharging this secondary battery at 0 to 2V, it was confirmed that the secondary battery has a plateau around 1.5 V.

Example 2

In accordance with the same method and procedure as in Example 1, a mixture layer including PTMA as an electrode active material and LiTFSI as an electrolyte salt was formed on a current collector.

Then, this electrode was folded in two, subjected to heat load to attach the mixture layers to each other, had a folded section cut, and put in a 2032-type coin cell to provide a secondary battery.

As a result of charging and discharging this secondary battery at 0 to 2V, it was confirmed that the secondary battery has a plateau around 1.5 V.

Example 3

As a nitronyl nitroxyl radical compound, 2-phenyl-4,4,5,5-tetramethylimidazoline-1-yloxyl-3-oxide phenyl nitronyl nitroxide represented by the following chemical formula (8b) was prepared.

(8b)

This nitronyl nitroxyl radical compound was dissolved in an acetonitrile solution to produce a first dissolved material.

In addition, a polyethylene oxide (polymer solid electrolyte) and LiTFSI (electrolyte salt) were dissolved in an acetonitrile solution to obtain a second dissolved material. Then, the first dissolved material and the second dissolved material were mixed to obtain a slurry.

Then, carbon black as a conductive aid was applied onto Al as current collectors, this carbon black was coated with polyvinylidene fluoride as an adhesive agent, the slurry was casted thereon, the acetonitrile as an organic solvent was dried to manufacture electrodes with a mixture layer formed on their surface.

Then, two of the electrodes with the mixture layers formed thereon were stacked so that the surfaces of the mixture layers are joined with each other, and subjected to thermocompression bonding by pressing at a temperature of about 100° C., thereby manufacturing a battery body. Further, the thickness of this battery body was about 200 μm.

After that, this battery body was put in a 2032-type coin cell to provide a secondary battery.

As a result of charging and discharging this secondary battery at 0 to 2V, it was confirmed that the secondary battery has a plateau around 1.5 V.

While the sheet-like members were formed on the current collectors in the present example, a battery body may be manufactured by manufacturing a sheet-like member and then attaching current collectors on the both surfaces of the sheet-like member.

The formation of the electrode active material and electrolyte into the shape of a sheet can achieve a secondary battery with safety in mind without the need for any costly separator or electrolytic solution.

DESCRIPTION OF THE REFERENCE NUMERALS

1: sheet-like member, 2a: first conductive layer (conductive layer), 2b: second conductive layer (conductive layer), $5_1$ to $5_n$: sheet-like member, $6_1$ to $6_n$: conductive layers, $7_1$ to $7_n$: conductive layers, $8_1$ to $8_n$: battery bodies

What is claimed is:
1. A secondary battery comprising:
a sheet-like member comprising a polymer compound, an electrode active material and an electrolyte; and
a first conductive layer and a second conductive layer located on opposed principal surfaces of the sheet-like member, the first and second conductive layers containing at least a conductive aid,
wherein the electrode active material contains an organic compound which participates in both oxidation and reduction reactions, and
wherein the secondary battery does not include a separator between the first and second conductive layers.
2. The secondary battery according to claim 1, wherein a positive electrode active material and a negative electrode active material constituting the electrode active material are formed from a same organic compound.

3. The secondary battery according to claim 1, wherein the organic compound has a stable radical.

4. The secondary battery according to claim 3, wherein the stable radical has a spin concentration of $10^{21}$ spins/g or more in equilibrium for one or more seconds.

5. The secondary battery according to claim 1, wherein the organic compound comprises a polymer radical compound or a derivative thereof.

6. The secondary battery according to claim 1, wherein the organic compound contains at least one of:
a nitroxyl radical represented by the following chemical formula 1;

a verdazyl radical represented by the following chemical formula 2;

wherein R indicates a substituted or unsubstituted methylene group; and
a nitronyl nitroxyl radical represented by the following chemical formula 3

7. The secondary battery according to claim 1, wherein at least one of the opposed principal surfaces of the sheet-like member contains the conductive aid.

8. The secondary battery according to claim 1, wherein the sheet-like member and the first and second conductive layers form an electrode body, and multiple electrode bodies are stacked to form the secondary battery.

9. The secondary battery according to claim 1, wherein the conductive layer contains the electrolyte and the electrode active material.

10. The secondary battery according to claim 1, wherein the conductive aid is selected from the group consisting of one or more of carbonaceous particulates; carbon fibers and conductive polymers.

11. The secondary battery according to claim 10, wherein the conductive aid is selected from the group consisting of one or more of graphite; carbon black; acetylene black; vapor-grown carbon fibers; carbon nanotubes; carbon nanohorns; polyaniline; polypyrrole; polythiophene; polyacetylene; and polyacene.

12. The secondary battery according to claim 1, further comprising:
a first current collector positioned adjacent the first conductive layer; and
a second current collector positioned adjacent the second conductive layer.

* * * * *